Patented Nov. 23, 1943

2,334,807

UNITED STATES PATENT OFFICE 2,334,807

ASBESTOS-CEMENT PIPE-FORMING MACHINE

John Arthur Cann, Bickley, England, assignor to Turner & Newall Limited, Spotland, Rochdale, England, a British company Application May 23, 1941, Serial No. 394,907
In Great Britain May 27, 1940

1 Claim. (Cl. 25—30)

This invention relates to machines for making pipes from asbestos-cement or like mixtures, that is to say, mixtures composed essentially of asbestos, a binding agent and water.

The most successful machines so far developed for making asbestos-cement pipes are those in which a conveyor web at least equal in width to the length of the pipe to be made carries a thin layer or film of wet asbestos-cement to a mandrel to which the layer is transferred, so that a pipe composed of a number of layers is built up on the mandrel. The mandrel rotates between rollers to one or more of which pressure is applied to compress the pipe as it is formed on the mandrel. It is this type of machine with which the invention is concerned.

In the machines of this type at present in use, the conveyor web travels over one or more fixed rollers below the mandrel and pressure is applied by one or more rollers mounted above the mandrel. As the pipe builds up on the mandrel the roller or rollers by which the pressure is applied are allowed to move away from the mandrel to accommodate the increasing thickness of the pipe. In practice, this is permitted by gradually decreasing the applied pressure. The pressure is usually applied hydraulically, and the whole hydraulic system is mounted in the top of the machine. It is necessary in practice so to construct the machines that they can make pipes of different diameters, and this fact makes it necessary to be able to move the roller or rollers to which the pressure is applied and the hydraulic system through a sufficient distance to receive and allow the discharge of mandrels of different sizes.

The principal object of the present invention is to simplify the whole machine and so render it cheaper to construct and easier to operate.

The conveyor webs used have to be replaced at fairly frequent intervals. A further object of the invention is to facilitate the replacement of one conveyor web by another.

Yet a further object is to provide a machine in which adjustment to accommodate rollers of different sizes is effected by moving the rollers to which the pressure is applied.

My invention will be most clearly understood by reference to the following description of the preferred form of machine embodying it, taken in conjunction with the annexed drawings, in which.

Figure 1:
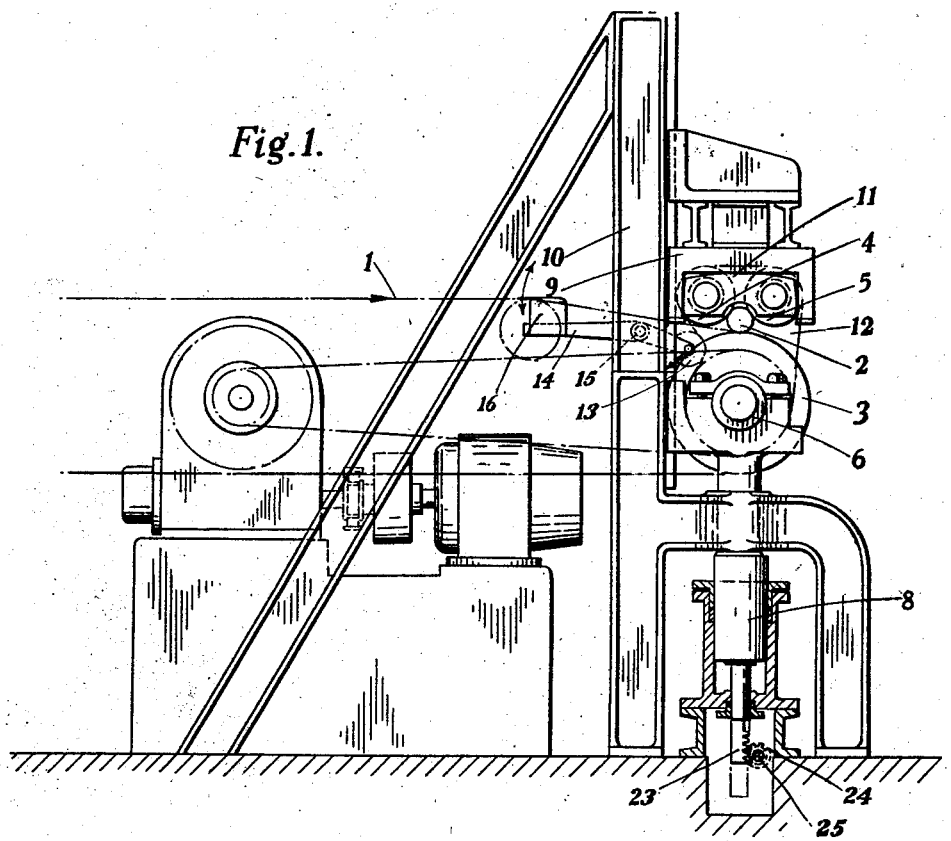
Figure 1 shows a side elevation, partly in section.
Figure 2:
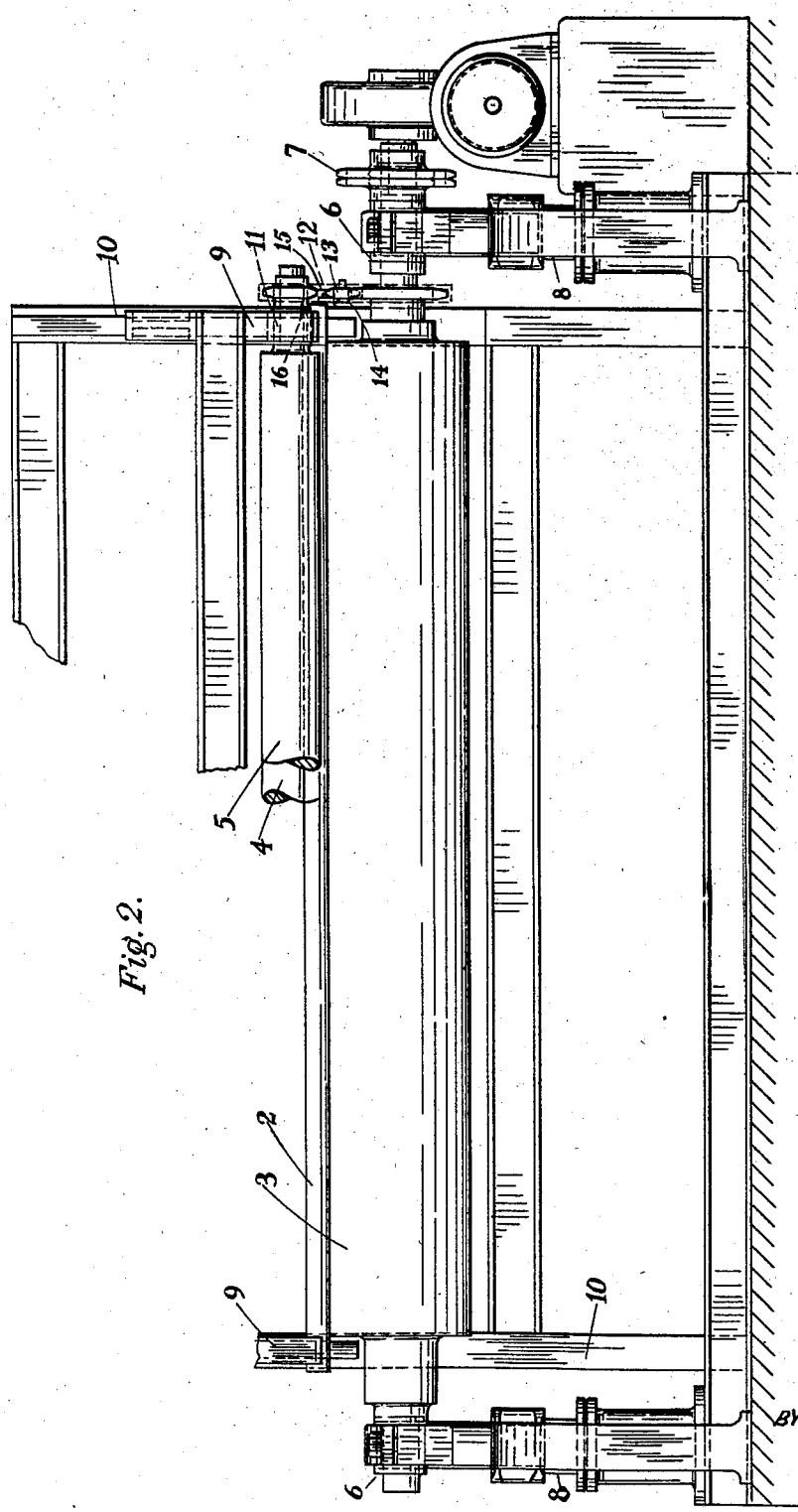
Figure 2 is a front elevation of the machine.

The machine is of the type described above and only so much of it is shown as is necessary for an understanding of the present invention. The pipe is formed by transferring successive layers of asbestos-cement from a travelling continuous felt 1 to a steel mandrel 2, the felt being wider than the length of the pipe to be formed. The mandrel 2, which is caused to rotate by its contact with the travelling felt, is carried in a cradle composed of three rollers, namely a roller 3, the axis of which lies vertically below the axis of the mandrel, and two rollers 4 and 5 arranged symmetrically above the mandrel. The felt 1 passes around the roller 3. This roller is carried by end bearings 6 and it is driven through a chain wheel 7. The bearings 6 are supported by hydraulic rams 8 which are both hydraulically interconnected and mechanically interconnected by means of racks 23 which are rigid with the rams and which mesh with pinions 24, the two pinions being carried by a common shaft 25 (not shown in Figure 2). This arrangement ensures that the rams move in synchronism. As the pipe builds up on the mandrel the rams 8 are lowered so as to accommodate the increasing thickness of the pipe wall. When the coating on the mandrel is thick enough, the rams 8 are lowered to their maximum extent to allow the coated mandrel to be removed from the machine and another mandrel inserted. The whole hydraulic mechanism is mounted on the ground and the hydraulic cylinders are fixed, which makes the construction of the machine comparatively simple, and the rams need have only a small stroke because they have to move only to a sufficient extent to allow the coated mandrel to be removed.

During the operation the rollers 4 and 5 are fixed in position. In order to allow pipes of different diameters to be made in the one machine, these rollers are mounted in brackets 9 which can be moved vertically on girders 10 forming part of the frame of the machine. The rollers 4 and 5 are carried in bearings 11 in the brackets 9 and are driven through chain drives 12. Each chain 12 is engaged by a jockey wheel 13 carried by one end of a double-armed lever 14 which is pivoted at 15 in one of the girders 10 and which carries a weight 16 at its other end. This arrangement enables the roller 3 to move downwards during operation, and the rollers 4 and 5 to be adjusted in position, without breaking the chain drive. Removal of the coated mandrels is, however, preferably permitted by moving the web-carrying roller 3 to which the variable pressure is applied.

It will be seen that the pressure, instead of being applied from above the mandrel as hitherto, is so applied from below that the resultant force passes vertically upwards through the axis of the mandrel, and that the axes of the fixed rollers that take the applied pressure are above the horizontal plane that contains the mandrel axis. It is largely by virtue of this novel arrangement that so much simplification is obtained. By mounting the roller to which the variable pressure is applied in bearings which are movable towards or away from the axis of the mandrel, changing of the conveyor web is rendered easier.

Although I prefer to use the machine shown in the drawings, the conveyor web may be nipped between the mandrel and more than one roller, and in such a case variable pressure may be applied to one only or to each of the web-carrying rollers.

I claim:

In apparatus for forming a pipe the combination with a lower roller at least as long as the pipe to be formed, of a traveling web running around said roller and driven thereby and adapted to carry on its outer surface a thin layer of pipe-forming material of a width equal to the length of the pipe being formed, supporting means below said roller adapted to apply variable upward pressure and shift said roller and belt vertically, means for rotating said roller, a cooperating upper beltless idler roller means at least equal in length to said pipe and fixed in position above said lower roller during each pipe-forming operation and spaced from said lower roller to form a cradle, and a rotatable mandrel of full pipe length in said cradle supported by said lower roller to pick up said web-carried material and press it into direct contact with the surface of said upper roller means to form the pipe against said surfaces as the lower roller and mandrel recede to accommodate the increasing thickness of the pipe and the successive layers accumulate on the mandrel.

JOHN ARTHUR CANN.